(12) United States Patent
Tertuliano et al.

(10) Patent No.: US 11,938,536 B2
(45) Date of Patent: Mar. 26, 2024

(54) NANOTEXTURED METAL POWDERS FOR 3D PRINTING OF METALS

(71) Applicant: The Board of Trustees of the Leland Stanford Junior University, Stanford, CA (US)

(72) Inventors: Ottman A. Tertuliano, Philadelphia, PA (US); Philip J. DePond, San Mateo, CA (US); Andrew Curtis Lee, Stanford, CA (US); Xun Gu, Palo Alto, CA (US); Wei Cai, Palo Alto, CA (US); Adrian J. Lew, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 9 days.

(21) Appl. No.: 17/706,259

(22) Filed: Mar. 28, 2022

(65) Prior Publication Data
US 2022/0305553 A1    Sep. 29, 2022

Related U.S. Application Data

(60) Provisional application No. 63/166,451, filed on Mar. 26, 2021.

(51) Int. Cl.
*B22F 1/07* (2022.01)
*B22F 1/05* (2022.01)
(Continued)

(52) U.S. Cl.
CPC .......... *B22F 1/07* (2022.01); *B22F 1/05* (2022.01); *B22F 1/065* (2022.01); *B22F 1/145* (2022.01);
(Continued)

(58) Field of Classification Search
CPC .... B22F 1/07; B22F 1/05; B22F 1/065; B22F 1/145; B22F 9/16; B22F 2301/10; B22F 2304/10; B22F 2999/00; B33Y 70/00; C23F 1/02; C23F 1/34; C23F 1/28; C23F 1/18; C23F 1/20; C23F 1/26; C23F 1/30; C25F 3/02
(Continued)

(56) References Cited

U.S. PATENT DOCUMENTS

2021/0308753 A1* 10/2021 Larouche ............... B22F 1/065
2021/0387259 A1* 12/2021 Barnes .................... B22F 1/102
(Continued)

OTHER PUBLICATIONS

Orhan, Study of Etch Rate and Surface Roughness in Chemical Etching of Stainless Steel (Year: 2008).*
(Continued)

*Primary Examiner* — Duy Vu N Deo
(74) *Attorney, Agent, or Firm* — LUMEN PATENT FIRM

(57) ABSTRACT

Metal powder particles for use in additive manufacturing are made by removing material from the surface of the particles using wet chemical etching to create a nanoscale texturing of
(Continued)

the surface, increasing absorptivity by the metal powder particles of incident laser light and maintaining flowability. The nanoscale texturing has sub-wavelength features at laser wavelengths in the range 800-1100 nm. The particles are substantially spherical and have mean diameters in the range 10-70 μm.

8 Claims, 12 Drawing Sheets

(51) Int. Cl.
*B22F 1/065* (2022.01)
*B22F 1/145* (2022.01)
*B33Y 70/00* (2020.01)
*C23F 1/02* (2006.01)
*C23F 1/34* (2006.01)
*B22F 9/16* (2006.01)

(52) U.S. Cl.
CPC ............... *B33Y 70/00* (2014.12); *C23F 1/02* (2013.01); *C23F 1/34* (2013.01); *B22F 9/16* (2013.01); *B22F 2301/10* (2013.01); *B22F 2304/10* (2013.01)

(58) Field of Classification Search
USPC ................................................ 216/100–109
See application file for complete search history.

(56) References Cited

U.S. PATENT DOCUMENTS

2022/0169863 A1* 6/2022 Kremenak .............. C09C 3/066
2022/0280999 A1* 9/2022 Bucher .................. B33Y 40/10

OTHER PUBLICATIONS

Gu et al., Laser additive manufacturing of typical highly reflective materials—gold, silver and copper. Scientia Sinica Physica, Mechanica & Astronomica, vol. 50 , Issue 3.
Jadhav et al., Surface Modified Copper Alloy Powder for Reliable Laser-based Additive Manufacturing. Jun. 2020, Additive Manufacturing.
Jadhav et al., Laser powder bed fusion additive manufacturing of highly conductive parts made of optically absorptive carburized CuCr1 powder. Materials & Design. vol. 198, Jan. 15, 2021.
Auinger et al., Effect of surface roughness on optical heating of metals, J. Europ. Opt. Soc. Rap. Public. 9, 14004 (2014).
Çakir Study of Etch Rate and Surface Roughness in Chemical Etching of Stainless Steel, Key Engineering Materials • Jan. 2008.
Jang et al., Inhibition of Bacterial Adhesion on Nanotextured Stainless Steel 316L by Electrochemical Etching. ACS Biomater. Sci. Eng. 2018, 4, 1, 90-97.
Dong et al., Fabrication of superhydrophobic Cu surfaces with tunable regular micro and random nano-scale structures by hybrid laser texture and chemical etching. J. Mat. Proc. Tech. vol. 211, No. 7, Jul. 2011, 1234-1240.
Qian et al., Fabrication of Hydrophobic Ni Surface by Chemical Etching. Materials (Basel). Nov. 2019; 12(21):3546.

* cited by examiner

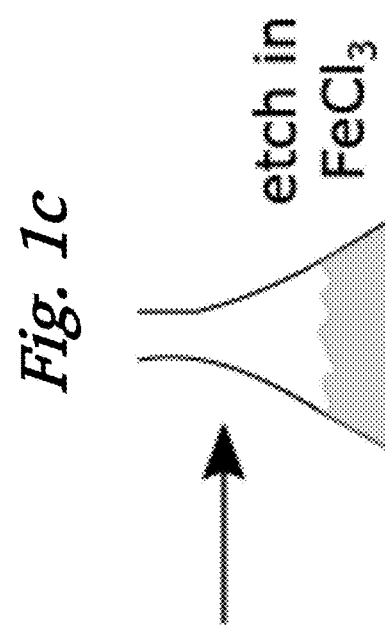
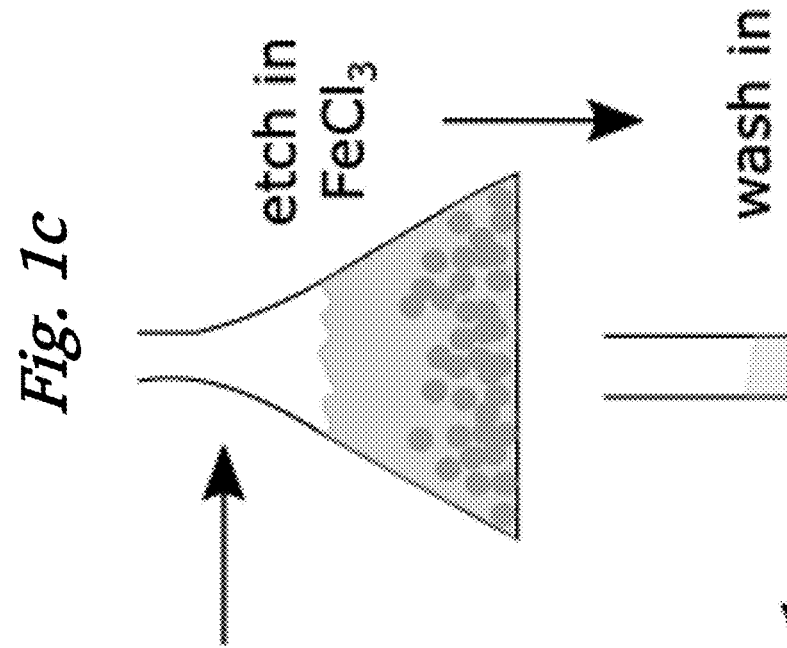
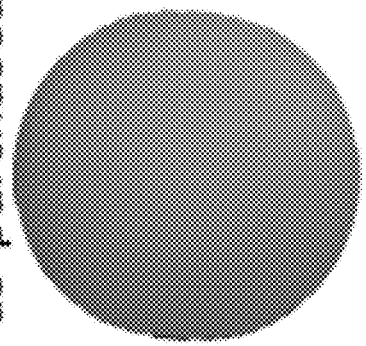
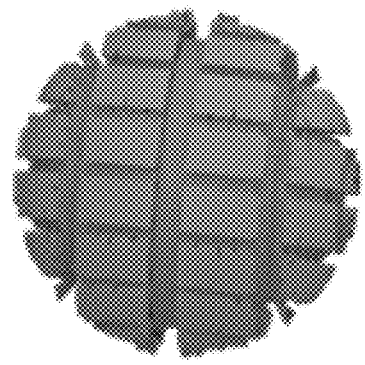
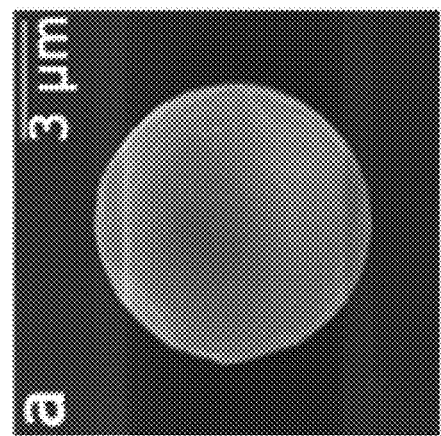
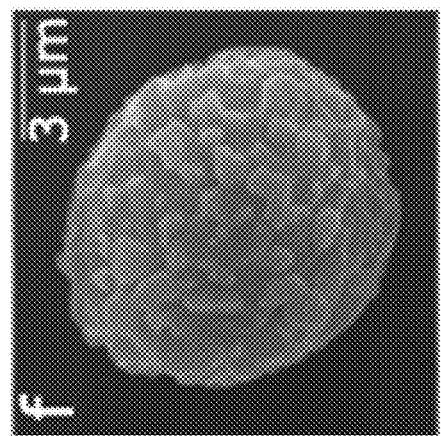

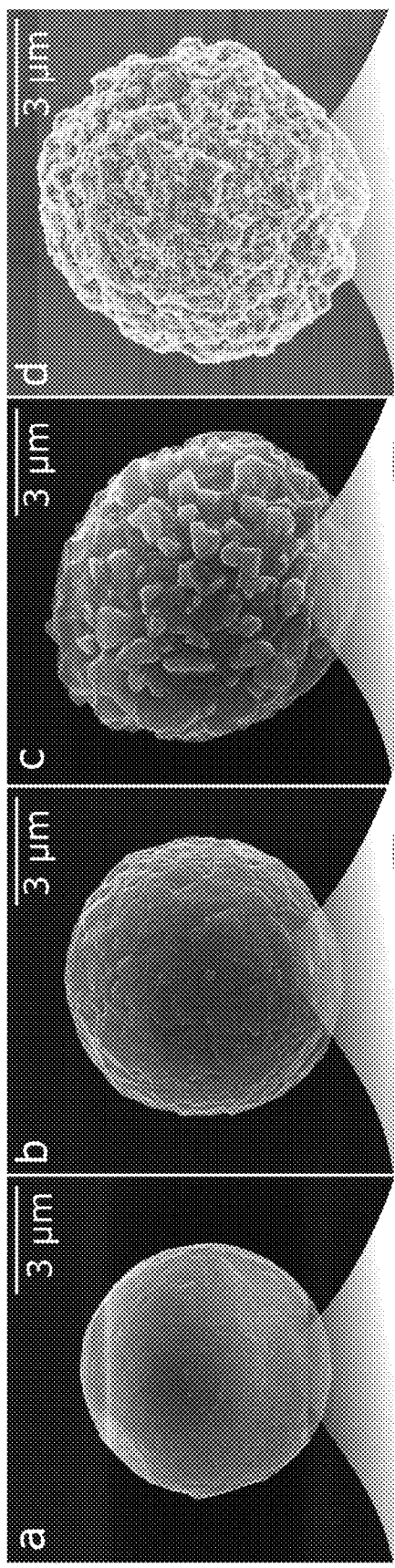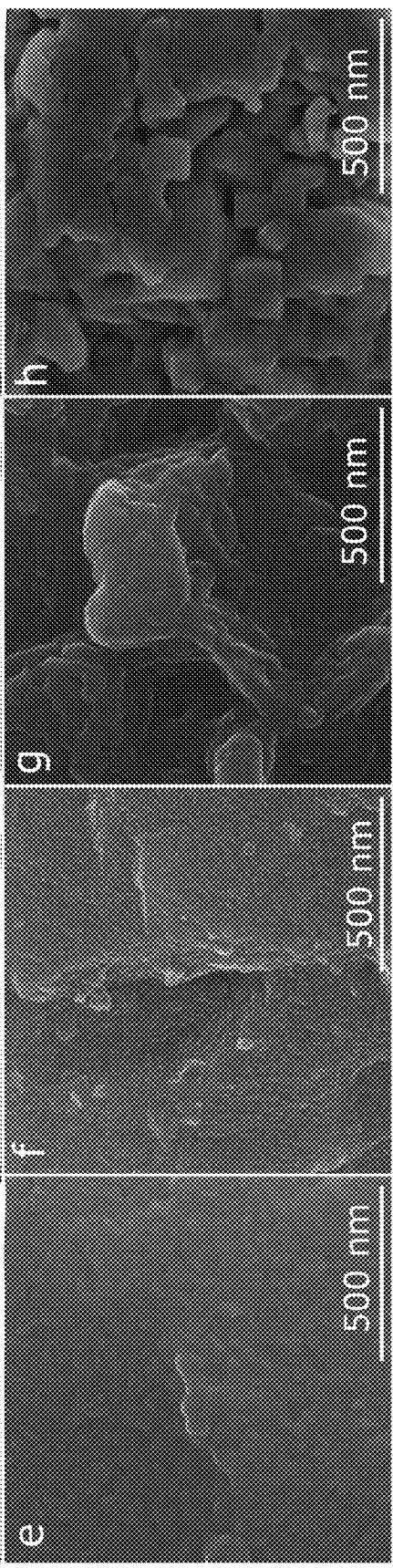

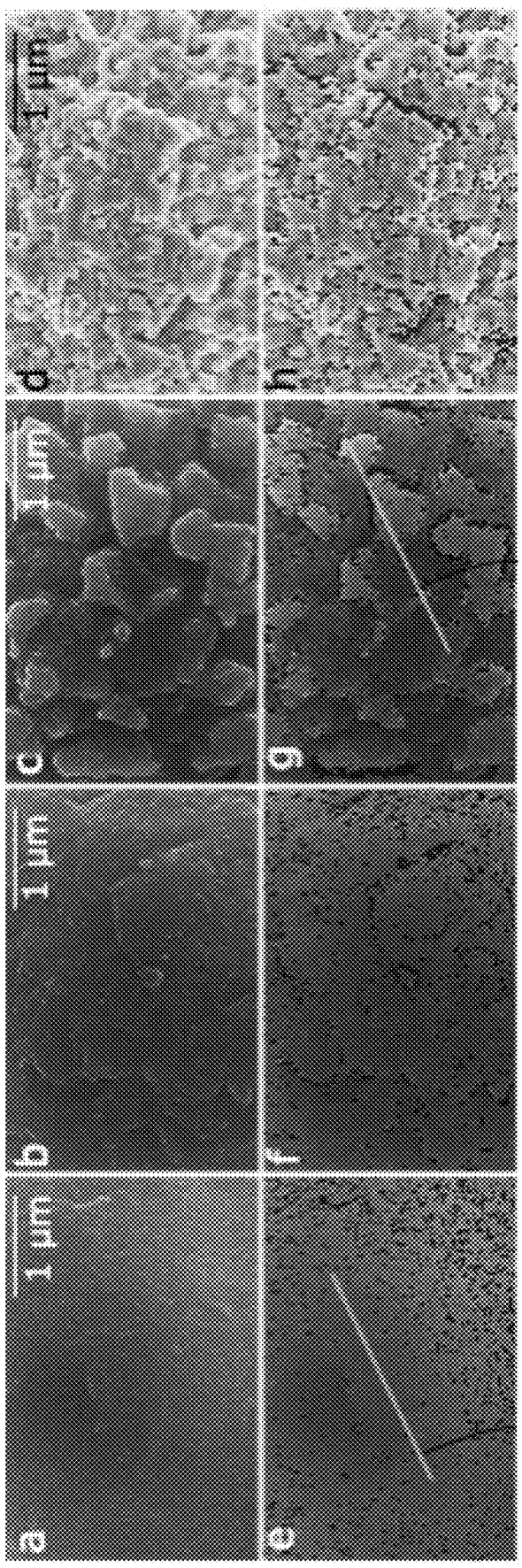

*Fig. 3i*
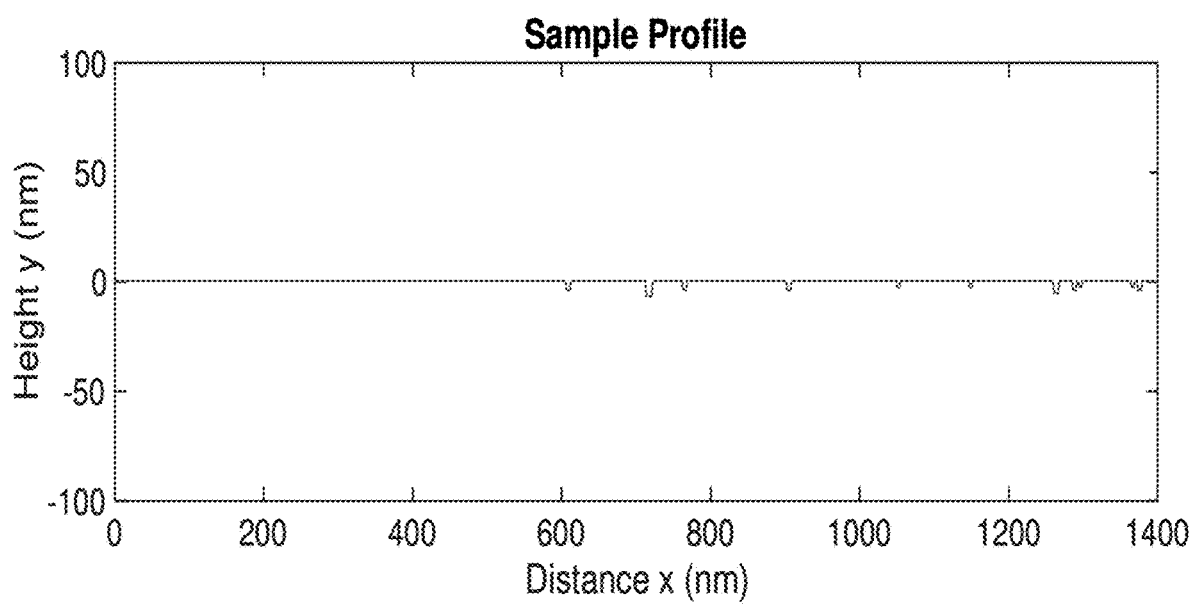
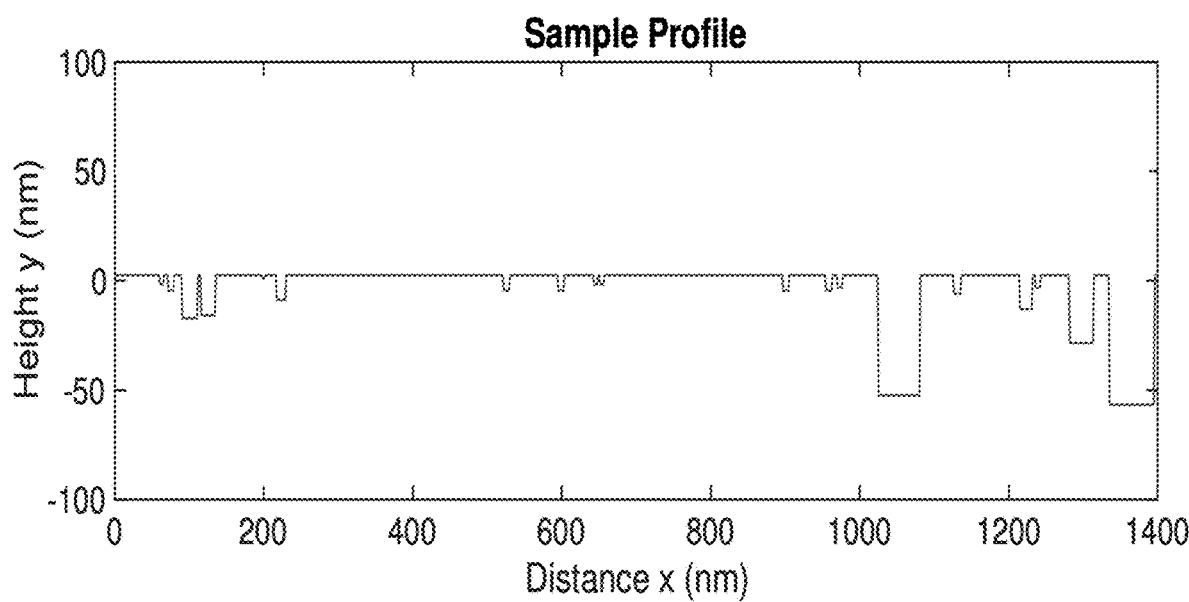
*Fig. 3j*

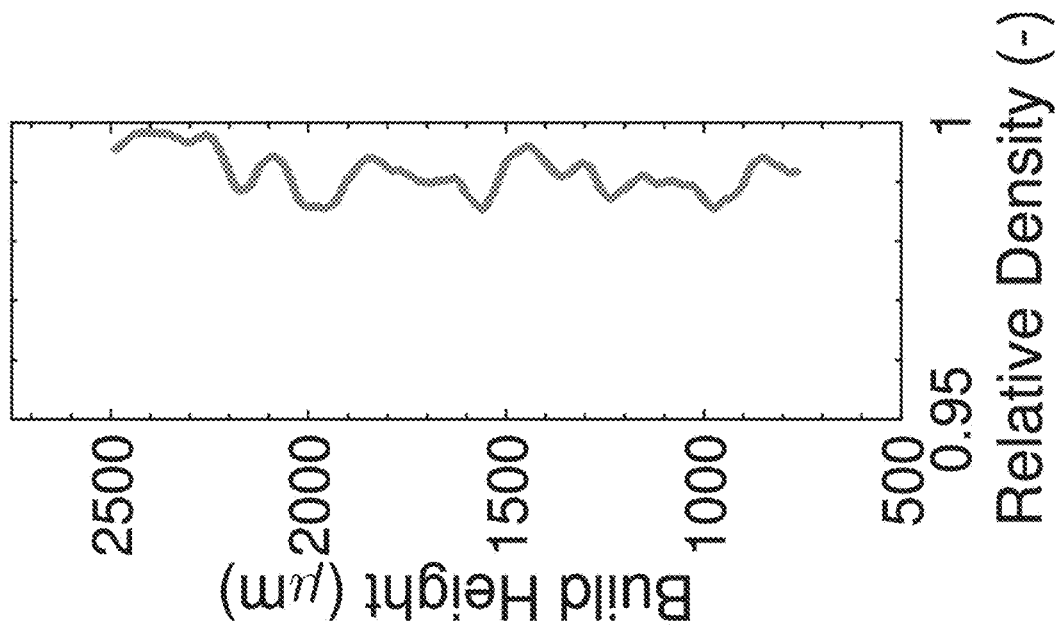
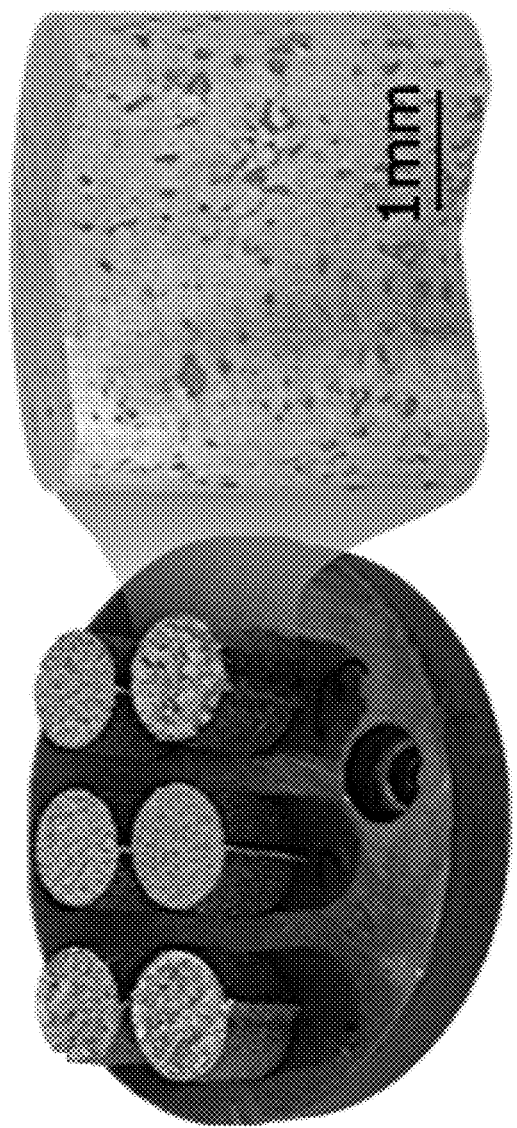
Fig. 5a  Fig. 5b  Fig. 5c

*Fig. 5d*
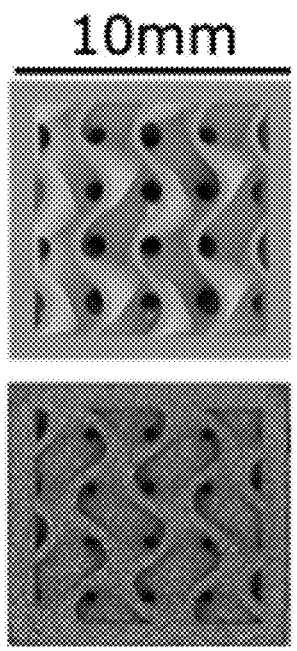
*Fig. 5f*
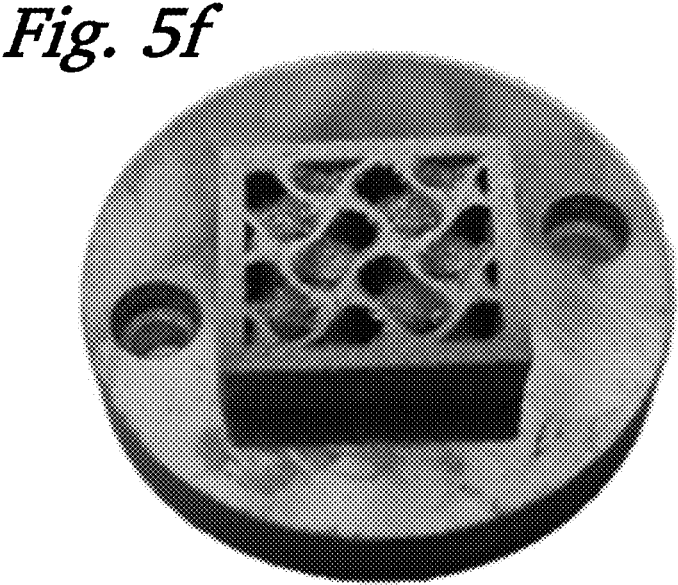
*Fig. 5e*

NANOTEXTURED METAL POWDERS FOR 3D PRINTING OF METALS

CROSS-REFERENCE TO RELATED APPLICATIONS

This application claims priority from U.S. Provisional Patent Application 63/166,451 filed Mar. 26, 2021, which is incorporated herein by reference.

STATEMENT OF FEDERALLY SPONSORED RESEARCH

None.

FIELD OF THE INVENTION

The present invention relates generally to additive manufacturing. More specifically, it relates to metal powders for use in additive manufacturing.

BACKGROUND OF THE INVENTION

Metal additive manufacturing (AM) is an emerging technology with widespread applications in the health care, aerospace, automotive and energy industries. The potential of metal AM is currently constrained by the limited library of readily printable metals, primarily stainless steels, AlSi10Mg, some Ni superalloys and Ti alloys. These materials are readily printable in commercial laser powder bed fusion (LPBF) systems. LPBF is a metal AM technique that employs a laser, usually in the near-infrared (IR) wavelengths range of 1060-1080 nm, to raster over a layer of metal powders (15-45 μm in diameter) in order to melt and fuse the powders. The process is repeated layer-by-layer to produce a 3D printed structure. There is increased interest in printing 3D structures for high performance devices using metals with high thermal and electrical conductivity, such as copper. Unlike the aforementioned metals, copper has a low absorptivity (high reflectivity) in the near-IR and a high thermal diffusivity. Because these material properties prevent heat localization during laser scanning, they serve as major hurdles to manufacturing fully dense copper parts in moderately powered (up to 400 W) commercial LPBF systems.

Seminal AM studies have developed methods that require introducing additives to the powder feedstock or changing the printing apparatus to modify resulting print microstructure and properties. Adding nanoparticles to aluminum powder alloys has allowed printing of high-strength, crack-free structures. Adding copper to titanium has enabled forming ultrafine-grained alloys with tunable strength. The alloy with stoichiometry Fe19Ni5Ti has enabled printing of Damascus steel in laser powder bed fusion.

Various approaches have been demonstrated for specifically printing copper. Custom made high power LPBF systems have been employed to overcome the low absorptivity barrier by printing copper at laser powers of 800 W and higher. These high power systems have been reported to damage optics in custom printers and deemed inadvisable. The absorptivity of copper also increases with temperature. This increase in absorptivity inherently makes controlling energy deposition into the copper melt pool difficult, an issue which escalates quickly when employing laser powers ~1 kW in copper metal AM.

The addition of nanoparticles to metal powders has been established as a promising approach to enable the printing of various metals. Aluminum 7075 powders have been decorated with $TiB_2$ nanoparticles to promote a transition from a columnar to equiaxed grain morphology, enabling the printing of fully dense parts without solidification cracks. High purity copper and micro-alloys have been printed by using nanoparticles to decorate stock copper surfaces. These approaches demonstrated that the room temperature optical absorptivity of the decorated copper powder increases to ~60% in comparison to ~20% for the uncoated copper. The use of additives in printing copper have resulted in increased yield strength but reduced electrical conductivity when chromium nitride was introduced to the surface copper powders and deleterious solidification cracking when carbon nanoparticles are introduced to the powders. The cracks observed in those studies originated at boundaries of segregated additives that did not melt, even at 0.1% weight fraction.

Existing approaches to enable 3D printer of high reflectivity metals such as copper use 1) Electron beam scanning systems that require a high vacuum system to operate; 2) High-powered laser scanning 3D printers (1 kW) to overcome the inefficiencies resulting from the high laser reflectivity; 3) Custom built visible light laser scanning systems (532 nm), instead of near infrared (1070 nm), which are not widely available at high powers.

There remains a demand for the ability to reliably print high purity metals such as copper, silver, gold and platinum for thermal and electrical conductivity applications. However, these materials are inherently difficult to 3D print due to their high laser reflectivity (low absorption) during the printing process.

SUMMARY OF THE INVENTION

Herein is disclosed a process for producing modified metal powder stock to enable printing of such powders with much smaller laser beam powers, including moderately powered printing systems (200-400 W). These are the most ubiquitous types of laser based 3D printing systems and do not require high vacuum or specialized optics to accommodate high laser power.

The process produces nanotextured metal powders to improve laser absorptivity during laser-based additive manufacturing. The surfaces of conventional metal powder particles are modified to create nanoscale surface features, preferably using wet chemical etching. Other techniques could also be used such as electrochemical etching and physical etching.

This modified metal powder will enable 3D printing of high purity copper metal structures using laser-based metal 3D printing systems. The resulting powder also maintains qualitative flowability.

In some specific realizations, the invention provides a nanotextured metal powder comprising a plurality of nanoscale (50 nm-1 μm) surface features, where the feature sizes are characterized by the width, height, and spacing between asperities on the powder surfaces as well as surface roughness metrics. The powder in the most common applications is composed of copper, and the nanotextured surface results in an in-situ optical absorptivity in the near IR (~1070 nm) up to 0.37.

In some specific realizations, the powder is formed using a batch chemical solution-based maskless wet etching procedure. The solution-based process produces nanoscale surface features in the 1-10 h etching time scale, on the surface of spherical powder. The etching is a subtractive process, removing material from the original powder particles, rather than plating or coating them. However, the etching can also produce nanoscale cubic features after 10 h of etching. We observe the formation of cubic copper structures on top of the powder, which is not the result of etching but of nucleation of new crystals from a saturated etching solution.

In one aspect, the invention provides a method for processing metal powder particles for use in additive manufacturing, the method comprising: removing material from the surface of the metal powder particles using wet chemical etching to create a nanoscale texturing of the surface, whereby absorptivity by the metal powder particles of incident laser light of predetermined wavelength ($\lambda$) is increased and the flowability is maintained; wherein the nanoscale texturing is characterized in that the root mean square roughness ($\sigma$) and correlation length ($\xi_0$) of surface features resulting from the nanoscale texturing of the surface is less than the predetermined wavelength ($\lambda$), wherein the predetermined wavelength ($\lambda$) is in the range 800-1100 nm.

The metal powder particles may be composed substantially of copper, silver, gold, aluminum, platinum, tungsten, niobium, chromium, or zinc. The metal powder particles preferably have mean diameters in the range 10-70 µm. The metal powder particles are preferably substantially spherical, defined to mean that for over 90% of the particles, $4\pi A/P^2 > 0.8$, where A is the particle cross-sectional area and P is the corresponding perimeter.

The method may further comprise rinsing the wet chemical etched metal powder particles in a solution of ethanol to remove residual precipitates produced during the wet chemical etching. The method may further comprise passing the wet chemical etched metal powder particles through a 70 µm sieve. Removing material from the surface of the metal powder particles using wet chemical etching preferably comprises submerging the metal powder particles in a solution and stirring.

The metal powder particles may be composed substantially of copper and the solution may be a solution of iron(III) chloride, ethanol, and hydrochloric acid. The wet chemical etching is preferably performed for a minimum duration of 60 minutes at room temperature with an etchant ratio of 70 g:50 ml:150 ml for $FeCl_3$:HCl:Ethanol.

In another aspect, the invention provides a metal powder stock for use in additive manufacturing, the metal powder stock comprising metal powder particles; wherein the metal powder particles are substantially composed of copper; wherein the metal powder particles have mean diameters in the range 10-70 µm; wherein the metal powder particles are substantially spherical, defined to mean that for over 90% of the particles, $4\pi A/P^2 > 0.8$, where A is the particle cross-sectional area and P is the corresponding perimeter; wherein the metal powder particles have a nanoscale texturing of the surface characterized in that the root mean square roughness ($\sigma$) and correlation length ($\xi_0$) of surface features resulting from the nanoscale texturing of the surface is less than the predetermined wavelength ($\lambda$) to be used in the additive manufacturing process, where the predetermined wavelength ($\lambda$) is in the range 800-1100 nm.

The nanoscale texturing of the surface of the metal powder particles may be characterized in that the height of features from surface of the powder and spacing between features range from 50 nm to 1000 nm. The metal powder particles preferably have mean diameters in the range from 10-70 µm. The ratio of mean surface feature size of the metal powder particles to mean diameter of the metal powder particles preferably is in the range from 0.0007 to 0.1. The mean surface feature size of the metal powder particles preferably is less than 10% of the mean diameter of the metal powder particles. The surface features may comprise sub surface grooves or surface asperities including etched grain boundaries, dislocation etch pits, and new crystals nucleating on the powder surface.

BRIEF DESCRIPTION OF THE DRAWINGS

FIG. 1a is an SEM image of an as-purchased copper powder particle. FIG. 1b is a schematic of as-purchased copper powder particle showing smooth surface. FIG. 1c is a schematic of as-purchased powder in $FeCl_3$-based etching solution in which the powder is stirred and etched for a minimum of 60 min. FIG. 1d is a schematic illustrating powder placed in ethanol in a 50 ml centrifuge tube to stop the etching process and remove precipitates and byproducts of the etching procedure. FIG. 1e is a schematic of copper powder after etching and cleaning process with surface features (not to scale). FIG. 1f is an SEM image of etched powder after full processing.

FIG. 2a is an SEM image of as-purchased powder. FIG. 2b, FIG. 2c, FIG. 2d are SEM images of powders etched for 1 h, 5 h, and 10 h, respectively. FIG. 2e, FIG. 2f, FIG. 2g, FIG. 2h are high magnification images of powder surfaces showing rough surfaces characterized by a change in feature size with etching time. FIG. 2g shows structures revealed by grain boundary etching in 5 h etched powders and FIG. 2h shows appearance of highly-faceted surface structure in 10 h etched powders.

FIG. 3a, FIG. 3b, FIG. 3c, FIG. 3d show high magnification images of Cu00, Cu01, Cu05, and Cu10 powders, respectively, where CuX indicates Cu etched for X hours. FIG. 3e, FIG. 3f, FIG. 3g, FIG. 3h are images of powder surfaces with edges of surface features highlighted in red. FIG. 3i, FIG. 3j are graphs showing sample surface profiles taken from images of Cu00 and the Cu05 powders. FIG. 3k, FIG. 3l are graphs of correlation functions for Cu00 and Cu05 etched powders, respectively.

FIG. 5a is an image of printed cylinders using nanotextured powder. FIG. 5b is an image of an extracted cylindrical sub-volume from 3D reconstruction of x-ray microtomography of a cylinder printed using a laser condition of 400 W and 300 mm/s. FIG. 5c is a graph of relative density as a function of build height for cylinder in FIG. 5b showing relative densities greater than 0.99 throughout the build height. FIG. 5d is a computer aided design (CAD) image of triply periodic minimal surface (TPMS) with potential use as a heat exchanger. FIG. 5e is a TPMS from FIG. 5d printed using nanotextured powder. FIG. 5f is an alternate view of TPMS in FIG. 5e showing the structure in 3D.

DETAILED DESCRIPTION OF THE INVENTION

Figure 2I:
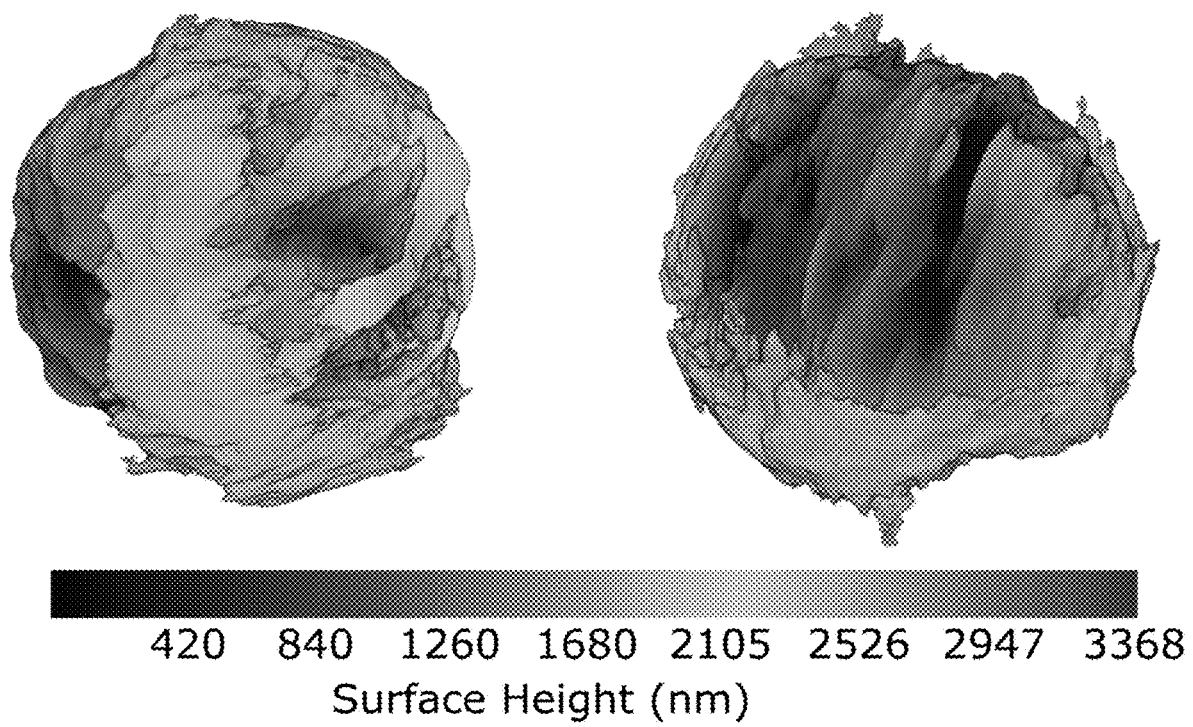
FIG. 2i illustrates reconstructed 3D images from x-ray nanotomography of a 5 h etched powder showing the height of the features relative to deepest point on the powder surface.
Figure 3K:
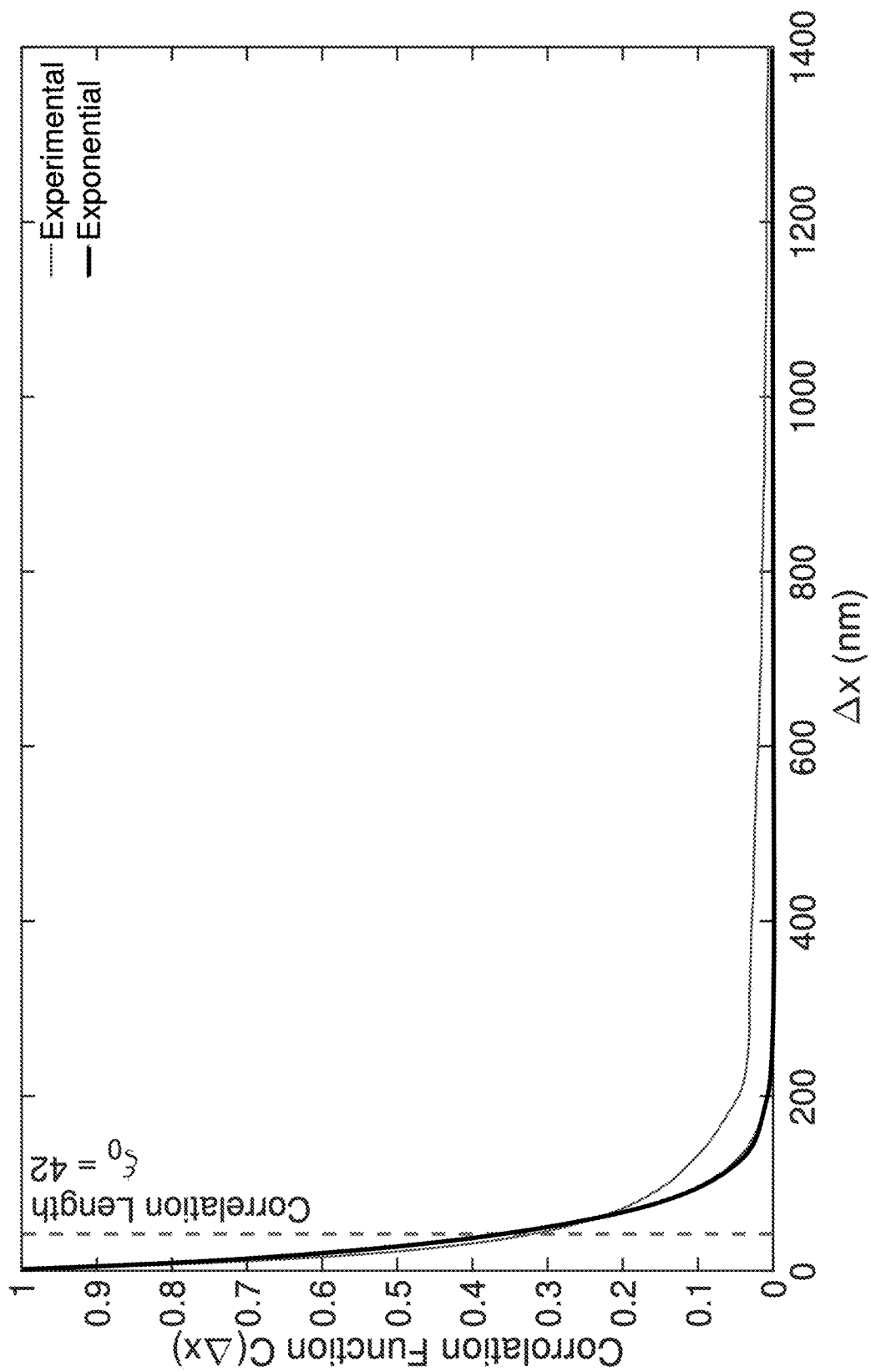
Figure 31:
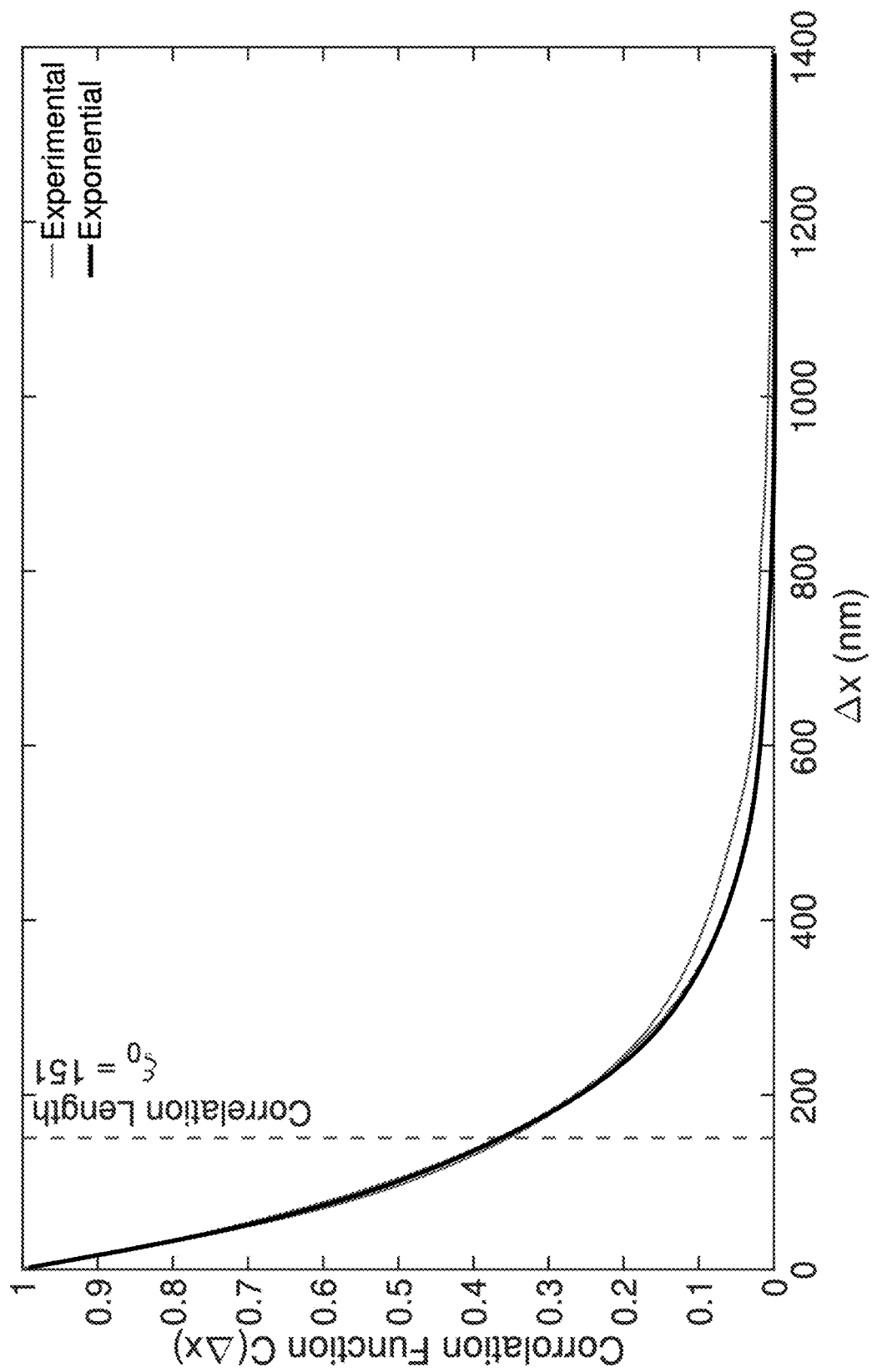

Metal additive manufacturing (AM) is an enabling technology in fields ranging from aerospace to biomedical. Its widespread application is limited by the ability to reliably print many metals commonly processed using conventional manufacturing. This limitation stems from an inability to control the complex interaction between the energy source and the feedstock, i.e., control over energy deposition into powders and the corresponding powder and melting dynamics.

Herein is disclosed a process to introduce nanoscale features to the surface of copper powders which increases by 70% the powder absorptivity of a laser. This enables printing of pure copper structures using low to moderate laser beam powers, i.e., powers in the range from 100 W to 400 W. The etched powders uniquely improve absorptivity and can enable printing of structures at low energy density. The improved absorptivity is likely due to a combination of the increased number of scattering events induced by the etched surfaces and the localization of electric field at the nanoscale features of the etched surfaces. The methods proposed in this work demonstrate a generalizable approach to modifying the absorptivity and printability by only changing the surface texture of the feedstock.

The present inventors have developed methods for producing modified metal powder stock, enable printing of copper powders with moderate laser beam powers using moderately powered printing systems (200-400 W). These are the most ubiquitous types of laser based 3D printing systems and do not require high vacuum or specialized optics to accommodate high laser power. This modified metal powder enables 3D printing of high purity copper metal structures using laser-based metal 3D printing systems. The resulting powder maintains flowability. In the present description, flowability of powder is defined as the relative movement of bulk powders among neighboring particles or along a container wall or surface. Flowability is quantified through angle of repose (static), compaction ratio (quasi-static) or ability to flow in a rotating drum (dynamic); it is qualified in metal additive manufacturing by the ability of a powder to be spread. The methods produce surface-textured metal powders to improve laser absorptivity and printability during laser-based additive manufacturing. The surface of conventional metal powders is modified using a technique such as wet chemical etching, electrolytic etching, physical etching, to create nanotexture on surfaces of the metallic powders.

According to one embodiment of the invention, introducing surface texture to the powders of metal powders is achieved by submerging and stirring the powders in an etching solution. Commercially available copper powder composed of spherical particles is submerged in a solution of iron(III) chloride, ethanol, and hydrochloric acid, an etchant with grain boundary selectivity, i.e., a preference for etching the grain boundaries in copper metal. This process transforms the powders from spherical with smooth surfaces to spherical with rough, nanotextured surfaces which contain nanoscale, sub-wavelength features such as asperities and trenches.

Etching Example

To etch the powders, we prepared an iron (III) chloride, hydrochloric acid and ethanol solution. For 100 g of smooth as-purchased copper powder (shown in FIGS. 1a,b), we first add 25 ml of acetic acid to a 250 ml Erlenmeyer flask and etch the native copper oxide layer on the powder for a total of 5 minutes, during which the solution turns blue due to the dissolution of the copper oxide layer and the distribution of copper ions in the solution; we stir at 400 RPM using a magnetic stir bar for 4 min and then allow the powder to sediment for 1 min. The acetic acid solution is removed from the flask using a pipette and 100 ml of the $FeCl_3$ etching solution is added to the flask. This solution (FIG. 1c) is covered with paraffin and stirred for 1, 5 or 10 h at 400 RPM, allowing the powders to be distributed in the solution. The flask is subsequently rested for 5 min to allow the powder to sediment. The $FeCl_3$ solution is discarded using a pipette. The powders are washed in fresh ethanol 8 times (FIG. 1d), or until the solution appears clear, by centrifuging in a 50 ml tube at 100 RPM for 60 s. The powders are poured out onto a 6 inch petri dish to dry for 5 h. After drying, the powders are sieved using <75 m mesh. The yield from this full process is about 90%, i.e., we produce 90 g of nanotextured powder (FIG. 1e,f) for 100 g of as-purchased powder. This reduced copper mass is a combination of dissolved copper and powder lost from the etching, washing, and sieving processes.

Absorptivity

To measure the absorptivity of the etched powder, we built a custom calorimetry experimental setup to fit on the build plate of a commercial metal 3D printer (Aconity Mini 3D). The printer is equipped with a 200 W and 1070 nm Yt-doped fiber laser. Copper substrates of C10100 purity (99.99%) are machined to have a thickness of 2 mm and a recessed area of 4×4 mm$^2$ with 50 µm depth. This recess area is filled with copper powder, and the depth sets the powder layer thickness used in the calorimetry experiments, i.e., 50 µm. The laser is then scanned on the powder in the form of a 3×3 mm$^2$ hatch pattern with a 75 µm hatch spacing. We scan at a power of 175 W and two speeds of 100 and 656 mm/s. During the laser scanning we collect the temperature of the copper substrate and powder using a type K thermocouple spot welded to the back of the substrate. We calculate the absorptivity as the ratio of energy used to raise the substrate with powder to the measured uniform temperature relative to the amount of laser energy input from the scanning. The calorimetric absorptivity measurement is described in detail in previous studies and is summarized as follows.

Using a method previously established for measuring the in-situ absorptivity of 316L stainless steel powder during laser scanning, we calculate the effective absorptivity as the ratio of input laser energy to the energy necessary to uniformly heat the substrate from a temperature $T_0$ to $T_1$. The absorptivity, $A_{\it{eff}}$ is given by $$A_{\it{eff}} = \frac{\int_{T_0}^{T_1} mC_p(T)dT}{Pl/v}$$

where m is the mass of the substrate, P is the laser power, v is the scanning speed, l is the total length of the hatch and $C_p$ is the temperature-dependent heat capacity of copper.

Printing

We performed all printing experiments using a low volume custom built laser powder bed fusion system at the Advanced Manufacturing Laboratory at Lawrence Livermore National Laboratory. The metal 3D printing system is equipped with a Yt-doped fiber 1070 nm wavelength scanning laser. The 2.5 cm build plate and approximately 10 mm build height allows for low volume prints using up to 200 g of copper powder. For each powder system, 6 mm diameter cylinders were printed using laser powers ranging from 100 to 500 W and laser scanning speeds of 300 and 600 mm/s. Triply periodic minimal surfaces were printed using 100 W and 300 mm/s and 200 W and 600 mm/s. The layer size and hatch spacing were 50 m and 80 m, respectively for all prints. The build chamber was prepared by pumping to $10^{-3}$ mTorr and purging with argon to reaching atmospheric pressure while maintaining an oxygen concentration less than 100 ppm.

Nano and Micro X Ray Tomography

We performed synchrotron x-ray nanotomography to characterize the surface features and obtain a 3D representation of the 5 h etched powder. The experiments were performed at Stanford Synchrotron Radiation Lightsource (SSRL) Beamline 6-2C. We used a 7 kV beam which produces a 15 nm pixel resolution. The pixels were binned by 2 during image acquisition, resulting in a 30 nm effective pixel size. Two images are collected (and averaged) at 0.5 degree increments over a range of 180 degrees. Ten reference images are taken, averaged, and used for background correction in the tomography images. The process and reconstruction are performed using an algebraic reconstruction technique (ART) with 20 iterations in TXM Wizard, an open source software developed by SSRL. The slices were reconstructed and visualized for relative density measurements and surface feature profiling using Dragonfly, a software freely available for research use.

We also performed x-ray microtomography to characterize the porosity in the printed cylinder structures using a Sky Scan 1273 x-ray microscope. Pixel sizes range from 4.25 to 5 μm in various scans of the printed cylinders. The slices were reconstructed and visualized for relative density measurements using Dragonfly. Grayscale 3D images were segmented using a watershed transform. Edges between two areas of interest, porous and solid regions, were identified using a Sobel edge detection method. Seeds for areas of interest were manually chosen using histographic segmentation and a watershed transform enabled segmentation of pores and solid aspects of the prints. Relative density measurements are defined as the volume fraction of the solid regions in the cylinder.

Results

Etching Produces Nanoscale Surface Structures

In one example, we developed nanotextured copper powders by etching as-purchased (LPW, 99.9% purity) and as-fabricated (LLNL 99.99% purity) copper powders using a solution of $FeCl_3$, HCl, and ethanol. The initial as-purchased LPW powder was processed for etch times ranging from 1 to 10 h to produce powders with varying surface roughness. As shown in the scanning electron micrograph (SEM) of FIG. 2a the surface of the as-purchased powder initially appeared smooth. As shown in FIG. 2b after 1 h of etching the surface began to exhibit uniform surface structures on the powder. FIG. 2c shows that etching for 5 h results in surface structures that substantially etched though grain boundaries in addition to the uniformly etched grain surfaces observed after 1 h. This is likely due to a high etching selectivity of grain boundaries. FIG. 2d reveals that after etching for 10 h, grain boundaries became highly visible and we observed the presence of cubic structures on the order of 100 nm on the surface of the powders. FIG. 2e, FIG. 2f, FIG. 2g, FIG. 2h show magnified regions of the surface of the powder particles shown in FIG. 2a, FIG. 2b, FIG. 2c, FIG. 2d, respectively. These magnified images of powder show progressively rougher surfaces characterized by an increase in feature size with etching time up to 5 h of etching. FIG. 2g shows structures revealed by grain boundary etching in 5 h powders and FIG. 2h shows appearance of highly-faceted surface structures in the 10 h etched powder. FIG. 2i shows tomography of the 5 h etched powder in two different viewing points of view. We may also refer to the four powder types based on the etching time as follows: Cu00, Cu01, Cu05, and Cu10, where CuX indicates X hours of etching.

We hypothesize that the surface morphology goes through three main stages: uniform etching, grain boundary etching and redeposition. The etching of Cu in $FeCl_3$ solutions occurs in two reactions. $FeCl_3$ strips Cu from the powder surface to create $CuCl_2$ in solution. This $CuCl_2$ in solution acts as a secondary etchant by pulling Cu from the powder surface to create 2CuCl. In the 1 h time scale, uniform etching occurs due to dissociation of Cu from the surface via complexing with Cl ions in the solution. In the 5 h time scale, grain boundary etching appears, as the etching selectivity of grain boundaries is higher than in bulk. We also consider the etching behavior between the 5 and 10 h timescale. Here we observe cubic nanocrystals on the surface of the powders. Energy dispersive spectroscopy has shown that these nanocrystals are primarily copper. Copper in the solution exists as $CuCl_2$ or 2CuCl and the nucleation of these cubic structures on the powder surface must be a preferable state at the concentrations achieved after 10 h of etching. The Cu nucleates in highly faceted cubic morphology with orthogonal faces, indicating preferential growth of {100} crystal planes, as observed in FIG. 2h. For the observed cubic structures to emerge, we likely need to achieve the following conditions in the etching solution: 1) reach the solubility limit of $CuCl_2$ in ethanol (around 5 g/100 mL) and 2) have a preferred dissociation of Cu from Cl so that Cu crystals can nucleate and grow on Cu powder surfaces.

To quantify the etching process, we measure the effective roughness of the powder surfaces by processing high magnification SEM images (FIG. 3a-d). We calculate the root mean square (RMS) surface roughness, u, and a correlation length, $\xi_0$. In order to quantify these features using SEM images, we identify the edges of the features (FIG. 3e-f) and assume that they are square with 1:1 aspect ratio (e.g., a trench that is 100 nm wide, is 100 nm deep). We make 5E4 random straight segment measurements on a binarized version of the surface to estimate surface profile and roughness statistics. Two such examples of these measurements are show in FIG. 3e and FIG. 3g. All 5E4 random measurements on one image are concatenated into an array of length n, with point coordinates ($x_i$, $y_i$) describing the profile as position and height, respectively. Sample surface profiles obtained from the concatenated array are shown in FIG. 3i and FIG. 3j. The RMS roughness is defined as $$\sigma = \sqrt{\frac{1}{n}\sum_{i=1}^{n} y_i - \overline{y}}$$

where $y_i$ is the height at a specific index i, $\bar{y}$ is the mean height. For simplicity, all data has been shifted such that $\bar{y}=0$. The unnormalized autocorrelation is defined as $$C(\Delta x) = \frac{1}{\sigma^2} \sum_{i=1}^{n-k} [y_i(x_i) - \bar{y}][y_{i+k}(x_{i+k}) - \bar{y}]$$

where k is defined so that $\Delta x = |x_i - x_{i+k}|$ is the distance between any two sampling points $x_i$ and $x_{i+k}$. The autocorrelation $C(\Delta x)$ is calculated for varying $\Delta x$ (i.e., increasing k) and exemplified in FIG. 3k and FIG. 3l for the as-purchased and 5 h etched powders, respectively. The autocorrelation function describes the dependance of the height at one location, $y_i(x_i)$, to the height at some point $\Delta x$ away, $y_{i+k}(x_{i+k})$. The autocorrelation function is fitted to the exponential exp $$\left(\frac{-|\Delta x|}{\xi_0}\right),$$

where $\Delta x = \xi_0$ is the correlation length. For the as-purchased powder, we calculate 3 and 42 nm for the values of $\sigma$ and $\xi_0$, respectively. We measure roughness values of 7, 18, and 13 nm on the Cu01, Cu05, and Cu10 respectively. For the correlation length we calculate 60, 151, and 86 nm for the same respective powder systems. It is important to note that the roughness metrics are measured by identifying the edges of asperities, binarizing the image and generating a surface profile based on such binary image. Due to this, the surface roughness values may be an underestimations of the actual surface roughness measurement by a physical contact profilometer or an atomic force microscope. The image calculated correlation lengths are expected to be more representative of those calculated from an experimental surface profile, as they are a measure of the horizontal distance between features rather than the absolute value of the feature height.

Etched Surfaces Increases Powder Absorptivity

Calorimetry experiments demonstrate that the nanotextured powders exhibits an improved absorptivity over the as-purchased copper powder. We observe that at a scanning power of 175 W and a speed of 100 mm/s, the Cu00 copper powder has an absorptivity of 0.172±0.007 and at 656 mm/s it has an absorptivity of 0.219±0.014. This provides a benchmark for the following powders. By scanning at the same laser power, the Cu01 copper powder exhibits absorptivities of 0.292±0.011 and 0.272±0.011 for laser speeds of 100 mm/s and 656 mm/s, respectively. In the Cu05, we measure of absorptivities of 0.286±0.045 and 0.372±0.021 at the 100 mm/s and 656 mm/s scanning speeds, respectively. The absorptivity measurements on the Cu10 powder were consistent at both laser speeds, resulting in absorptivities of 0.291±0.011 at 100 mm/s and 0.277±0.028 at 656 mm/s. At both scanning speeds, 100 and 656 mm/s, the nanotextured powders exhibit up to a factor of 1.6 improvement in absorptivity over the as-purchased powder. The Cu05 at the slower scan speed provides the highest improvement in absorptivity factor of 1.7 over the as-purchased copper powder.

We hypothesize the improved absorptivity using the nanotextured powders could have contributions from 1) increased surface area due to nanotexturing or 2) optical resonance induced by nano-sized surface features, both of which could enhance the absorption of light by the powder. The transition between the increased surface area absorption enhancement to resonance absorption enhanced should occur when the characteristic roughness becomes smaller than the wavelength of the incident light. Specifically, when the ratio of surface features defined by the root mean square roughness, ($\sigma$), and correlation length ($\xi_0$), to the wavelength of the incident light ($\lambda$), becomes smaller than $$1\left(\frac{\sigma}{\lambda} < 1, \frac{\xi_0}{\lambda} < 1\right).$$

The features achieved via the $FeCl_3$ wet chemical etching are characterized by asperities and trenches resulting from uniform surface etching, grain boundary etching, and redeposition on the copper surfaces; each mechanism described above appears to be time dependent.

Taking the Cu00 and Cu05 powders into consideration, the image analysis results in $$\frac{\sigma}{\lambda} = 0.003, \frac{\xi_0}{\lambda} = 0.039$$

for the Cu00 powder and $$\frac{\sigma}{\lambda} = 0.017, \frac{\xi_0}{\lambda} = 0.141$$

for the Cu05 powder. The Cu00 powder has a nominally flat surface, thus specular reflection is expected to dictate the light matter interaction. The Cu05 contains a nanotextured surface with features that are nanoscale, and characteristic roughness metrics much smaller than the incident wavelength. The results suggest any enhanced absorption observed in the nanotextured powders is likely from sub-wavelength optical phenomena.

Etched Powders Used to Demonstrate Printing

Figure 4A:
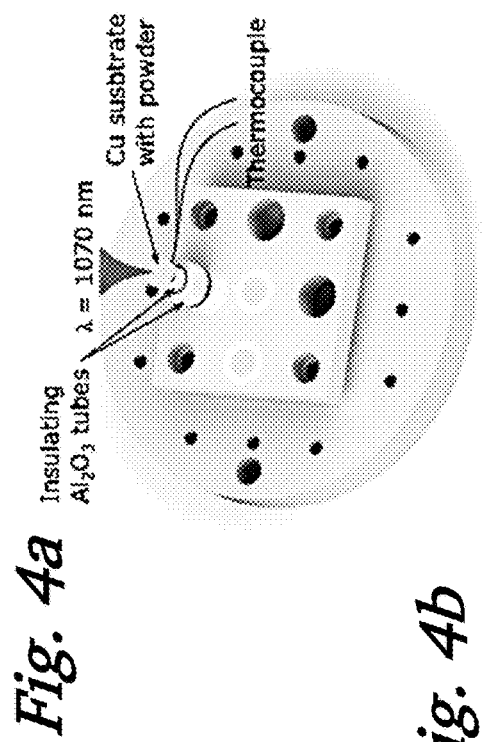
FIG. 4a illustrates a custom built in-situ calorimetry experimental setup.
Figure 4C:
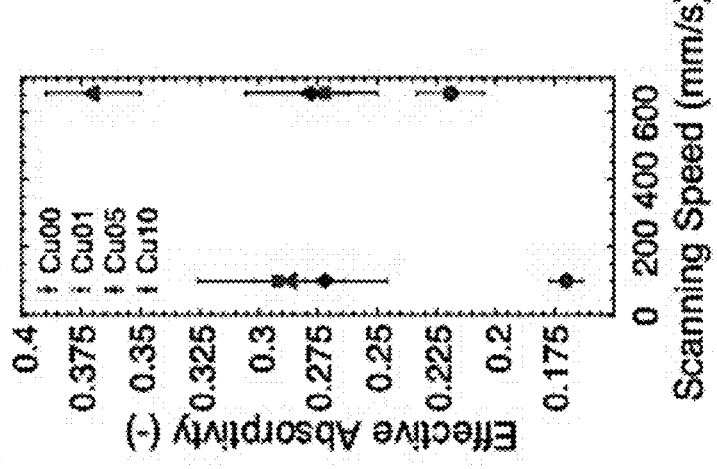
FIG. 4c is a graph of effective absorptivity for as-purchased (Cu00) and etched copper powders (Cu01, Cu05, Cu10) at a laser power of 175 W and speeds of 100 and 656 mm/s.
Figure 4B:
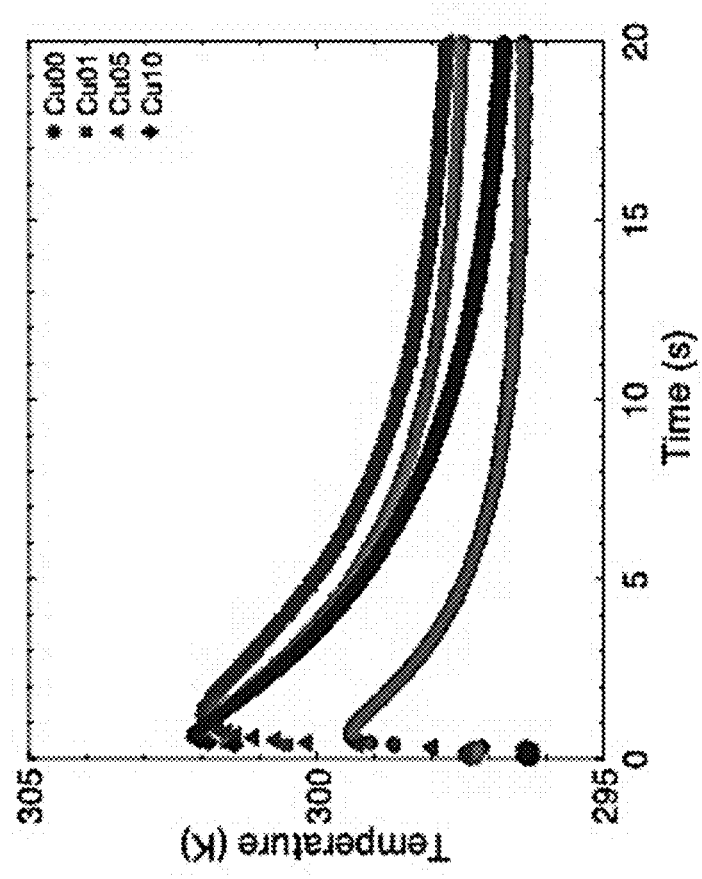
FIG. 4b is a graph of time vs. temperature data from calorimetry experiments performed at a laser power of 175 W.

FIG. 4a illustrates a custom built in-situ calorimetry experimental setup used to test absorptivity of the powders. FIG. 4b is a graph of time vs. temperature data from calorimetry experiments performed at a laser power of 175 W. The data shows an increase in the peak substrate temperature in etched powder experiments relative to as-purchased powders. FIG. 4c is a graph showing effective absorptivity for as-purchased (Cu00) and etched copper powders (Cu01, Cu05, Cu10) at a laser power of 175 W and speeds of 100 and 656 mm/s. The results show an increase in effective absorptivity of etched powder relative to as-purchased copper powders both scan speeds. The largest improvement is observed at the faster scan speed of 656 mm/s using the 5 h etched powder system, Cu05.

FIG. 5a is an image of cylinders printed from nanotextured metal powders. FIG. 5b shows an extracted cylindrical sub-volume from 3D reconstruction of x-ray microtomography of a cylinder printed using a laser condition of 400 W and 300 mm/s. FIG. 5c is a graph of relative density as a function of build height for the cylinder in FIG. 5b showing relative densities around 0.99 throughout the build height. FIG. 5d shows a computer aided design (CAD) image of a triply periodic minimal surface (TPMS) with potential use as a heat exchanger. FIG. 5e shows a TPMS from FIG. 5d printed using nanotextured powder. FIG. 5b shows alternate view of TPMS in FIG. 5e showing the structure in 3D.

Figure 6A:
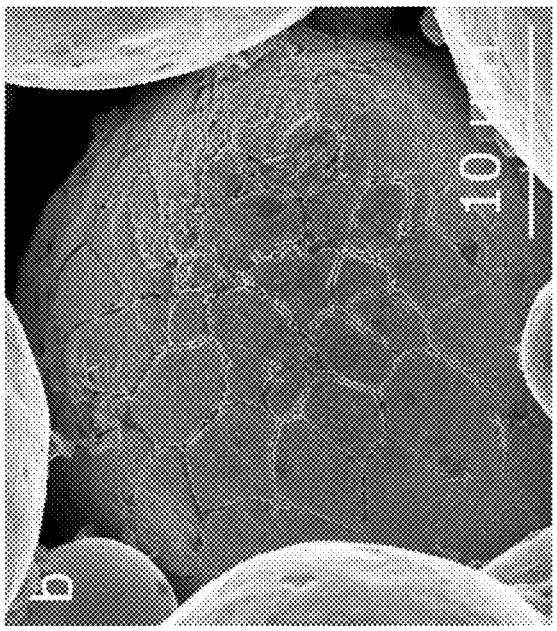
FIG. 6a is an image of as-purchased copper powders.
Figure 6B:
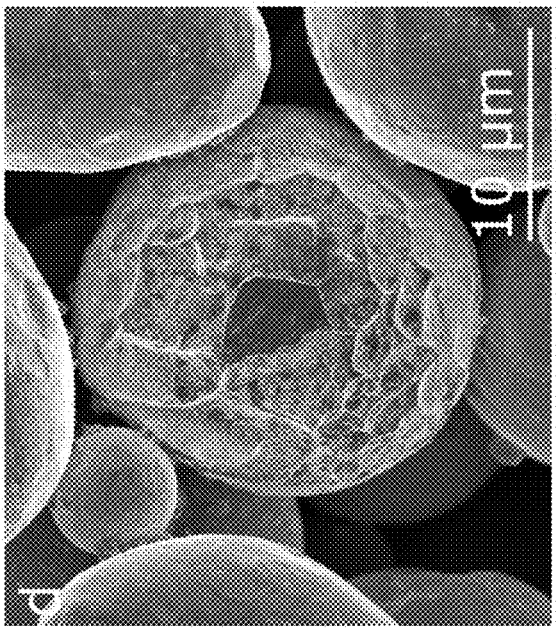
FIG. 6b shows a higher magnification image of as-purchased powder with some visible grain boundaries.
Figure 6C:
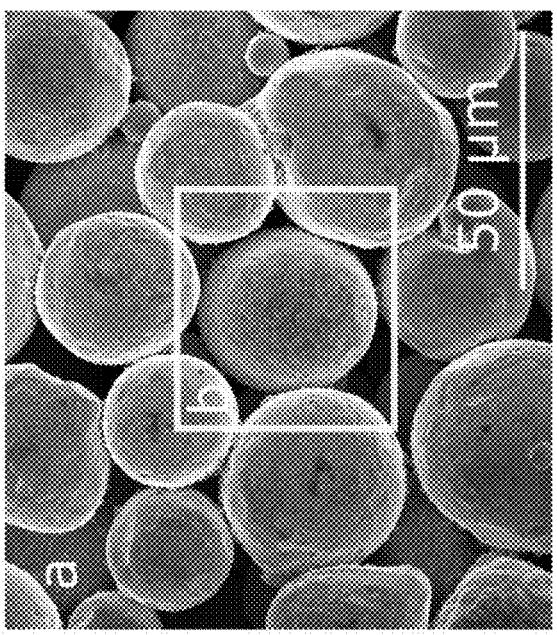
FIG. 6c shows an image of electrochemically etched powder.
Figure 6D:
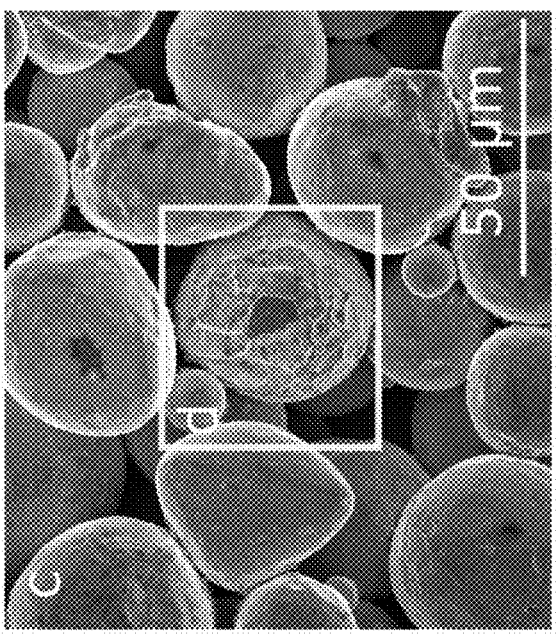
FIG. 6d shows a higher magnification image of electrochemically etched powder showing rough surface, where grains appear to etch at a higher selectivity than grain boundaries.
Figure 6E:
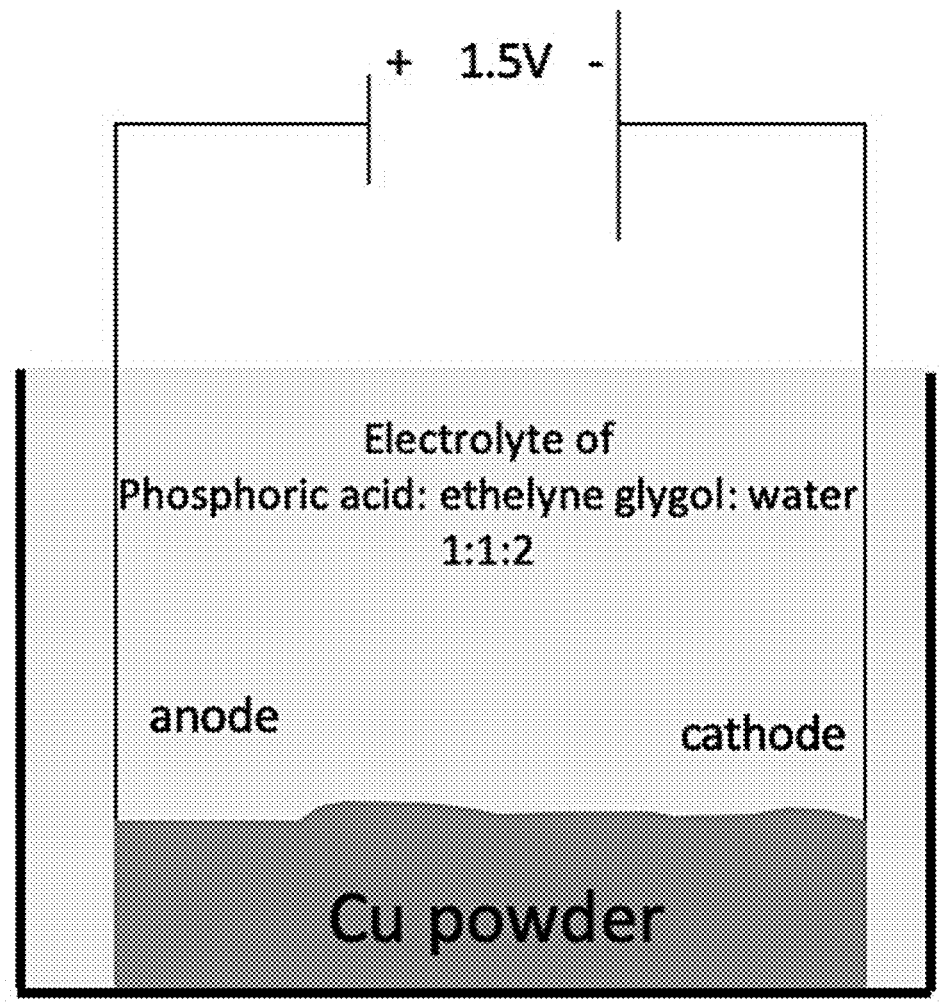
FIG. 6e is a schematic showing electrochemical etching performed by submerging powder in a solution of phosphoric acid: ethylene glycol:water at a volumetric ratio of 1:1:2.

FIG. 6a is an image of as-purchased copper powders. FIG. 6b shows a higher magnification image of as-purchased powder with some visible grain boundaries. FIG. 6c shows an image of electrolytically etched powder. FIG. 6d shows a higher magnification image of electrochemically etched powder showing rough surface, where grains appear to etch at a higher selectivity than grain boundaries. FIG. 6e is a schematic showing electrochemical etching performed by submerging powder in a solution of phosphoric acid:ethylene glycol:water at a volumetric ratio of 1:1:2. The cathode is in contact with one side of the copper powder layer and the anode is in contact with the other side. The etching bath had a 1.5 V bias applied for 30 minutes, resulting in powders shown in FIG. 6c and FIG. 6d.

Variations

The detailed examples demonstrate a wet etching technique for producing copper powder for additive manufacturing which enjoys the properties of high absorptivity at infrared wavelengths and flowability. Based on this discovery, the techniques above may be adapted to other surface texturing techniques and material compositions as described below. We also describe a variation which we envision could enable scaling from processing 100 g batches of powder at the lab scale to 1000 kg and larger batches in a commercial manufacturing scale.

Wet Chemical Etch

As describe above, wet chemical etching of metal powders can be performed by submerging and stirring the powders in a solution which chemically reduces the metal. Here, as-purchased spherical copper powder particles are submerged in a solution of iron(III) chloride (a well known copper etchant), ethanol, and hydrochloric acid, with higher preference for etching the grain boundaries in copper. This process transforms the powders from spherical with smooth surfaces to spherical with rough, nanotextured surfaces.

There are various etchants for other metals that can be produced in a lab or available commercially. Silver may be etched with piranha solution (i.e., sulfuric peroxide composed of 96% $H_2SO_4$ and 30% $H_2O_2$ in a ratio of about 50:1).

Gold may be etched with diluted aqua regia composed of 37% HCl, 70% $HNO_3$, and $H_2O$ in a volumetric ratio of 3:1:2 or Au-5 gold etchant which is stoichiometrically 5% I: 10% KI: 85% $H_2O$.

Aluminum may be etched using a solution of $H_3PO_4$: $HNO_3$:HAc:$H_2O$ at ratio of 80%:5%:5%:10%. It may also be etched in diluted HF or diluted NaOH based solutions.

Platinum may be etched in a solution of $HNO_3$:HCl:$H_2O$ at a ratio of 5 ml:25 ml:30 ml. It may also be electrochemically etched in a solution of HCl:NaCl:$H_2O$ at a ratio of 20 ml:25 g:65 ml.

Tungsten can be electrochemically etched in a solution of HCl:HF:methanol at a ratio of 5 ml:1 ml:100 ml.

Chromium may be etched in a solution of $H_2SO_4$:$H_2O$ at a ratio of 10 ml:90 ml as well as a solution of HCl:$HNO_3$: glycerol at ratio of 30 ml:15 m:45 ml.

Niobium may be etched in a solution of $H_2O_2$:$NH_4$:$H_2O$ at a ratio of 20 ml:10 ml:70 ml.

Rhodium may be etched in a solution of $NO_4$:HCL at a ratio of 1 ml:10 ml.

Zinc may be etched in $CrO_3$:$Na_2SO_4$:$H_2O$ at a ratio of 40 g:3 g:200 ml.

The lab scale process could be translated to commercial scale using a large scale baffled batch reactor. Such a batch processes may incorporate at least 1000 kg of powder. Etching solutions can be mixed in large batches. The batch reactor could use a double pitch blade agitator for mixing and enable surface coverage of the powders in the solution. The batch container and agitator would need to be non-metallic to prevent being etched by or reacting with the solution. The powder could then be cleaned using a filtration column, sieve, or a large scale reverse osmosis system. To consider sustainability in etching copper powder, a copper chloride solution can be used as the etchant instead of the iron chloride solution described above. The use of copper chloride etching may enable 1) recovery of dissolved copper from the solution and 2) potential reuse of the solution for further batch etching processes.

Electrolytic Etch

We performed a preliminary electrochemical etching procedure to determine viability of etching copper powders as shown in FIG. 6a-e. Electrochemical etching is performed by submerging 40 mg of copper powder in 50 ml of electrochemical etching solution of phosphoric acid:ethylene glycol:water at a volumetric ratio of 1:1:2. FIG. 6e shows the cathode in contact with one side of the copper powder layer and the anode with the other side in the etching bath. We applied a 1.5 V bias for 30 minutes. SEM images of a random location sampling of the powders after the procedure demonstrates a few powders with etched surfaces, as shown in FIG. 6c and FIG. 6d.

Physical Etch

A physical etch on metal powders could be performed using broad ion mill typically used for polishing flat substrates with no chemical selectivity, i.e., non-reactive argon ions bombard a surface and remove atoms by transferring kinetic energy. This process is often used for preparing surfaces for transmission electron microscopy (TEM) or electron backscattered diffraction (EBSD). To adopt this for introducing roughness on metal powders, a "masking" layer would need to be introduced onto the powder surfaces via nanoparticle solution (i.e., alumina). The powders would then be etched with a broad ion mill; the areas of the metal powders covered by alumina would not etch until alumina has been consumed by the milling process while the exposed parts of the metal powders would be etched. This could introduce nanoscale surface features onto metal powders.

In general, the proposed process may be used in the production of improved metal powder feedstock for 3D printing of highly reflective metals.

The invention claimed is:

1. A method for processing metal powder particles for use in additive manufacturing, the method comprising:
   performing maskless wet chemical etching of a metal surface of the metal powder particles to preferentially etch material at grain boundaries and dislocations from the metal surface and to create a nanoscale texturing of the metal surface, resulting in nanotextured metal powder particles, whereby absorptivity by the nanotextured metal powder particles of incident laser light of predetermined wavelength ($\lambda$) is increased and the flowability is maintained;
   wherein the metal powder particles are composed substantially of copper, silver, gold, aluminum, platinum, tungsten, niobium, chromium, or zinc;
   wherein the nanoscale texturing is characterized in that the root mean square roughness ($\sigma$) and correlation length ($\xi_0$) of surface features resulting from the nanoscale texturing of the metal surface is less than the predetermined wavelength ($\lambda$), wherein the predetermined wavelength ($\lambda$) is in the range 800-1100 nm.

2. The method of claim 1 wherein the metal powder particles have mean diameters in the range 10-70 µm.

3. The method of claim 1 wherein the metal powder particles are substantially spherical, defined to mean that for over 90% of the particles, $4\pi\ A/P^2 > 0.8$, where A is the particle cross-sectional area and P is the corresponding perimeter.

4. The method of claim 1 further comprising rinsing the wet chemical etched metal powder particles in a solution of ethanol to remove residual precipitates produced during the wet chemical etching.

5. The method of claim 1 further comprising passing the wet chemical etched metal powder particles through a 70 µm sieve.

6. The method of claim 1 wherein removing material from the surface of the metal powder particles using wet chemical etching comprises submerging the metal powder particles in a solution and stirring.

7. The method of claim 6 wherein the metal powder particles are composed substantially of copper and the solution is a solution of iron(III) chloride, ethanol, and hydrochloric acid.

8. The method of claim 7 wherein the wet chemical etching is performed for a minimum duration of 60 minutes at room temperature with an etchant ratio of 70 g:50 ml:150 ml for $FeCl_3$:HCl:Ethanol.

\* \* \* \* \*